April 12, 1932.  W. E. ROTH  1,854,067
HYDRAULIC BRAKE
Filed June 18, 1929   2 Sheets-Sheet 1
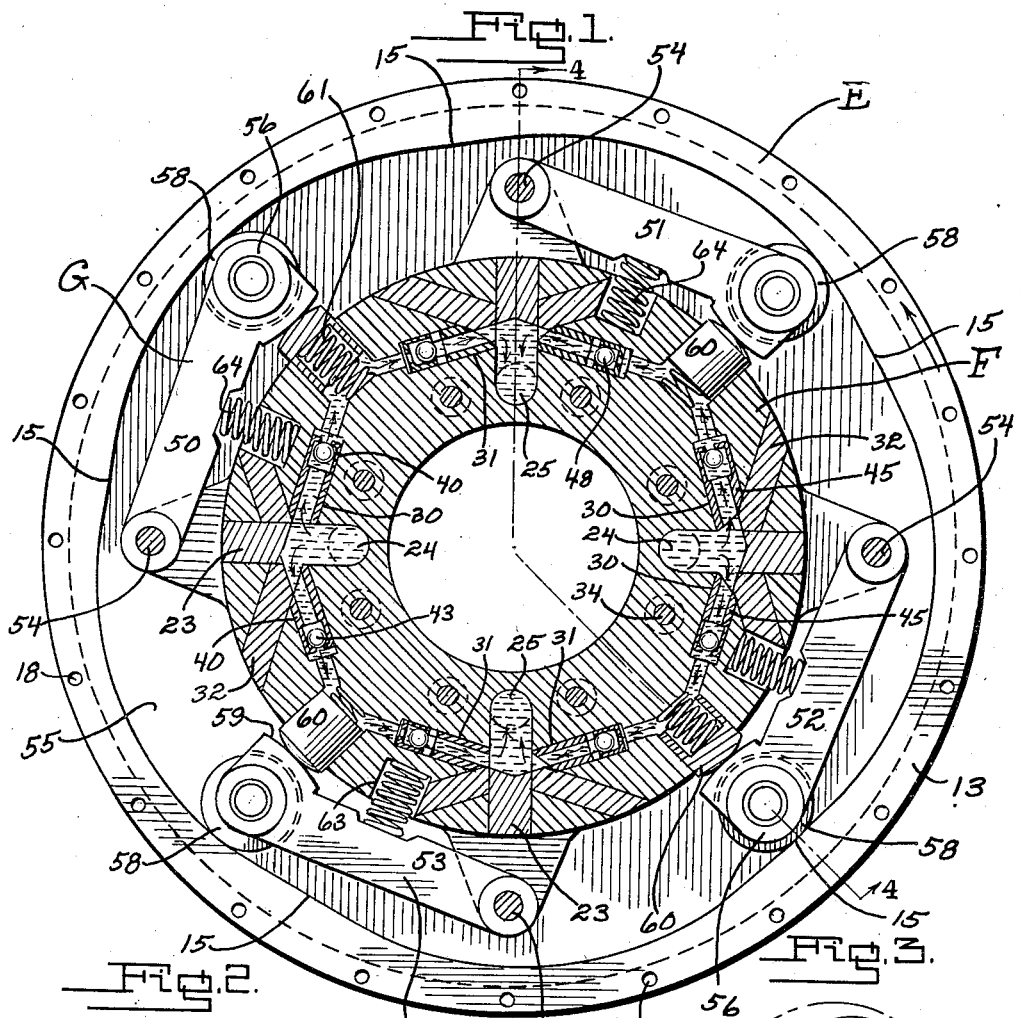
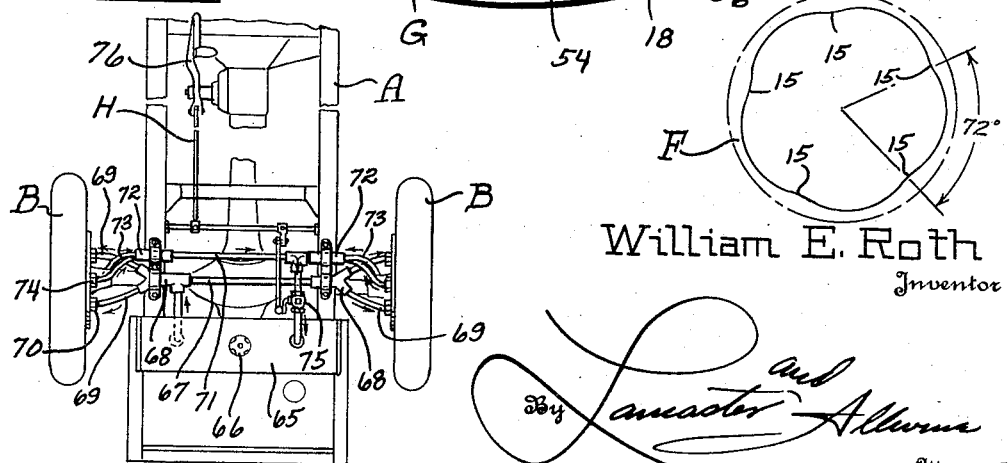
William E. Roth
Inventor

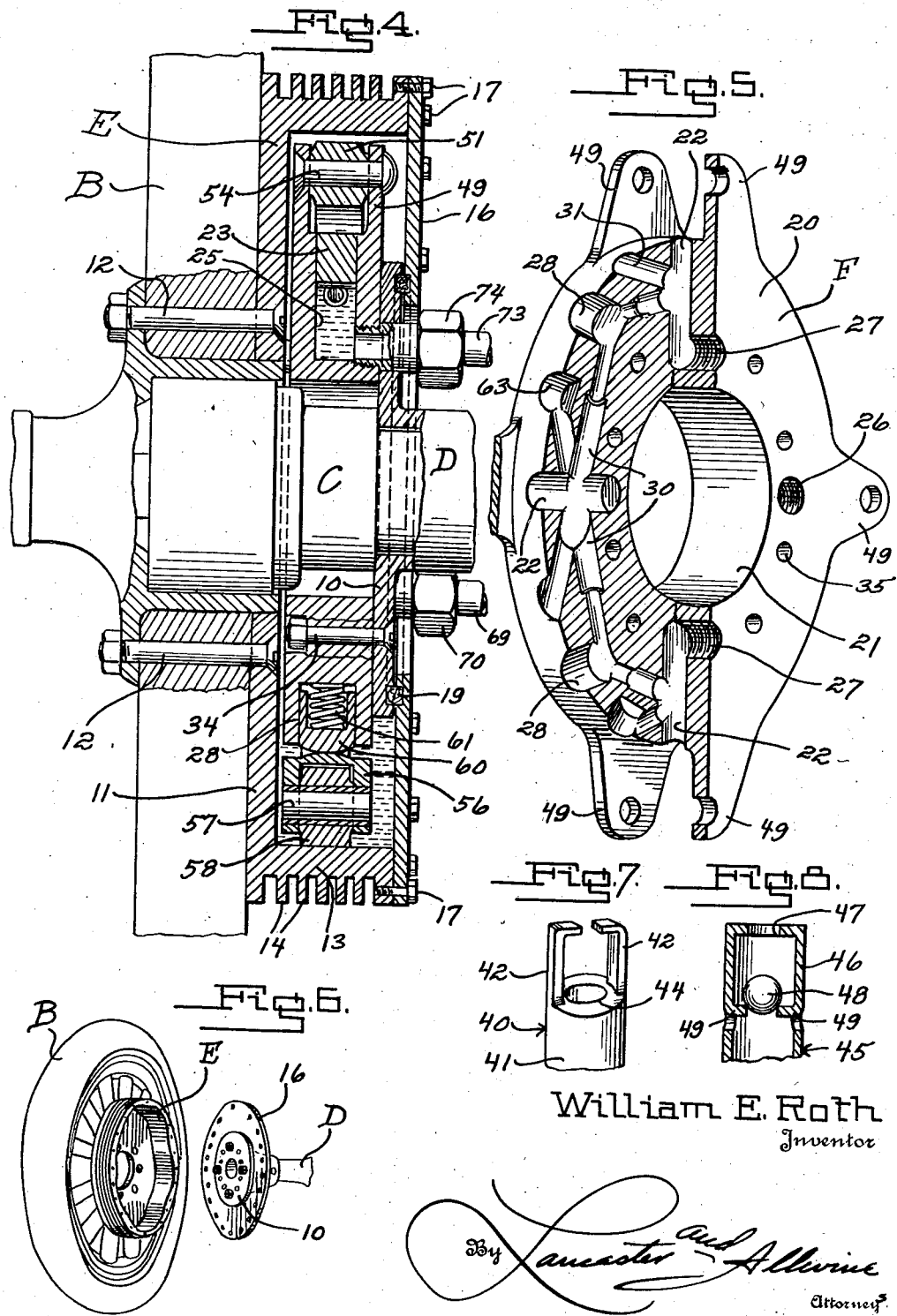

Patented Apr. 12, 1932

1,854,067

UNITED STATES PATENT OFFICE

WILLIAM E. ROTH, OF HOUSTON, PENNSYLVANIA, ASSIGNOR OF ONE-HALF TO FREDERICK W. TOWNROW, OF CANNONSBURG, PENNSYLVANIA

HYDRAULIC BRAKE

Application filed June 18, 1929. Serial No. 371,835.

The present invention relates to improvements in brake mechanism primarily intended for use in connection with automotive vehicles, and the primary object of the invention is to provide an improved fluid operated brake embodying novel operating features whereby the vehicle wheels may be gradually retarded against rotation to various degrees or locked against rotation by the action of a fluid under compression.

A further object of the invention is to provide a fluid operated brake wherein the rotary movement of the wheels acts to compress the body of fluid which in turn acts to retard rotation of the wheel in accordance with the opening and closing of a manually operated control valve.

A further object of the invention is to provide an improved hydraulic brake embodying a series of fluid compressing cylinders and actuating means therefor automatically operable upon rotation of the wheel in a manner whereby upon operation, the cylinders operate successively for creating a gradual braking action on the wheels.

A further object of the invention is to provide a hydraulic brake mechanism for vehicle wheels wherein the fluid is not retained under compression during normal running of the vehicle, and one wherein the degree of braking action is controlled by a valve serving to bypass more or less of the fluid when compressed by rotary action of the wheel.

A still further object of the invention is to provide a brake mechanism for vehicle wheels embodying a stationary cylinder block having novel features of construction whereby the block serves as a mounting for the compression cylinders and various check valves serving to control the flow of fluid serving as a medium for creating the braking action.

Other objects and advantages of the invention will be apparent during the course of the following detailed description, taken in connection with the accompanying drawings forming a part of this specification and in which drawings:

Figure 1 is a view of the inner edge of the rotary drum and showing the stationary cylinder block in section for illustrating the particular arrangement of compressors and the various channels or ducts for the fluid medium.

Figure 2 is a diagrammatic top plan view of the rear portion of a motor vehicle and showing the improved brake mechanism as applied thereto.

Figure 3 is a diagrammatic view showing the particular arrangement of the cam surfaces of the rotary drum.

Figure 4 is a section on line 4—4 of Figure 1 and showing the manner in which the mechanism is associated with the conventional type of vehicle wheel.

Figure 5 is a view part in side elevation and part in section of the stationary cylinder block and showing the manner in which the same may be drilled for providing the fluid passageways.

Figure 6 is a detail perspective view showing the manner in which the brake drum is applied to the inner side of the vehicle wheel and the cover plate for the brake drum for providing a housing for the cylinder block.

Figure 7 is a fragmentary detail perspective view of one of the intake check valves.

Figure 8 is a fragmentary section thru one of the exhaust check valves.

Referring to the drawings in detail, and wherein similar reference characters designate corresponding parts thruout the several views, the letter A designates a conventional type of motor vehicle chassis embodying a pair of rear wheels B mounted upon an axle C enclosed within the usual fixed axle housing D. Mounted for rotation with the wheels B is a cam drum E in which is mounted a stationary cylinder block F provided with fluid compressor means G operable for creating a braking action upon the wheels B as by the control means H.

The axle housing D for enclosing the axle C is stationary as in usual practice, and is provided at its end with an annular flange 10 of a diameter less than that of the cam drum E. This flange 10 serves as means for rigid mounting of the cylinder block F against rotation within the cam drum E.

The cam drums E and one of which is preferably mounted at the inner side of each of the wheels B, take the place of the ordinary brake drums and embody plate portions 11 which may be secured to the wheel B as by means of suitable bolts 12 preferably having counter-sunk heads arranged at the inner face of the plate portion. Arranged at the peripheral portion of the plate 11 and projecting inwardly from the wheel is a cam rim 13 provided at its outer side with circumferentially extending ribs or fins 14 which act as reinforcing means for the rim and also act in the capacity of cooling fins for the rim. The internal surface of the rim 13 is provided with a series of equi-distantly spaced apart cam projections 15 which in the example shown are five in number and are arranged at 72° apart. Thus it will be seen by observing Figures 1 and 3 that each of the cam projections 15 is arranged at a point diametrically opposite to the low side of the cam surface formed at the inner side of the rim 13. Arranged over the inner side of the cam drum E is a cover plate 16 which is secured at its peripheral portion to the inner edge of the rim 13 as by means of a suitable number of cap bolts 17 threaded into the openings 18 in the rim. This cover plate 16 is provided with an axial opening of greater diameter than that of the axle housing D but of less diameter than that of the flange 10 so that the cover plate overlies the inner side of the flange 10 in a manner as illustrated in Figure 4. An annular packing ring 19 is arranged between the overlapping portions of the flange 10 and plate 16, and thus it will be seen that a closed housing is provided for mounting of the stationary cylinder block F and its associated parts. The housing thus formed provides an oil reservoir in which a suitable quantity of lubricant may be maintained for lubrication of the fluid compressor means G.

Referring now to the cylinder block F, the same is of a one-piece construction and embodies an annular or ring-shaped body portion 20 forming an axial opening 21 thru which the rotating axle C may pass. Drilled into the annular body 20 from the external periphery thereof and preferably spaced midway between the side faces of the body, is a series of four equi-distantly spaced apart radially extending bores 22 which after being drilled are closed as by means of suitable plugs 23 driven into the outer ends of the bores and providing a series of alternately spaced intake and outlet chambers or pockets 24 and 25 respectively arranged at 90° apart as illustrated in Figure 1. Opening into the inner end of each of the intake chambers 24 and extending to the inner side of the annular body 20 is a threaded inlet opening 26, while opening into the inner end of each of the outlet chambers 25 and extending to the inner side of the annular body 20 is a threaded outlet opening 27. Thus it will be seen that the chambers 24 and 25 open to the inner side of the annular body portion 20 thru the openings 26 and 27 respectively. Drilled into the annular body 20 at the circumferential ring-shaped body and spaced midway between each of the radially extending bores 22, are cylinder forming bores 28 which also extend radially of the body 20 and are preferably of slightly greater diameter than that of the radially extending bores 22. Drilled or otherwise formed in the ring-shaped body 20 and opening at the circumferential face thereof between each of the adjacent bores 22 and 28 is a series of tangentially arranged bores forming intake and exhaust channels 30 and 31 respectively being closed at their outer end as by means of suitable plugs 32. These channel forming bores 30 and 31 intersect at each of the bores 22 and have their inner ends opening into the cylinder forming bores 28 as clearly illustrated in Figures 1 and 5. By observing Figure 1 it will be seen that the channels 30 and 31 form a polygonal-shaped passageway forming communication between the inner end of each of the cylinder forming bores 28 and the chambers 24 and 25 whereby a suitable fluid, preferably in the nature of oil, may have ready communication between the intake and outlet chambers and their respective cylinder forming bores. Thus it will be seen that by so drilling the ring-shaped body 20 and then closing the bores by means of suitable plugs, that the cylinder block F is rendered susceptible of ready manufacture for formation of the communicating channels between the intake and outlet chambers 24 and 25 respectively and their respective cylinder forming bores. This drilling of the channels 30 and 31 also renders possible the installation of suitable check valves to be subsequently described. The cylinder block F is intended to have its inner face arranged in abutting relation with the outer face of the axle housing flange 10 and is secured to the flange as by means of suitable bolts 34 passing thru suitable apertures 35 extending transversely thru the ring-shaped body 20 between the openings 26 and 27 and inwardly of the polygonal-shaped passageway formed by the channels 30 and 31. Thus it will be seen that the flange 10 serves for mounting of the cylinder block F against rotation within the cam drum E.

Mounted within each of the intake channels 30 between the intake chamber 24 and each of its companion cylinder forming bores 28, is a check valve structure 40 embodying a tubular sleeve portion 41 provided at its exit end with hook-shaped arms 42 serving as a retention means for a ball valve 43 adapted to engage upon the seat 44 in a manner whereby the intake check valve structures 40 serve for allowing passage of the oil from the chambers 24 to each of the companion cylinders 28 and prevents retrograde movement of the oil to the chambers 24 upon seating of the ball valves 43. Arranged within each of the exhaust channels 31 between the intake chambers 24 and their companion cylinders 28, is an exhaust check valve structure 45 in the form of a tubular sleeve 46 having a valve seat forming opening 47 provided at its intake end for seating engagement of a ball valve 48 held in position within the sleeve as by means of fingers 49 struck inwardly of the sleeve in slightly spaced relation from the intake end thereof. These exhaust check valve structures 45 act to allow free passage of oil to the exhaust chambers 25 but prevent retrograde movement of the oil from the chambers to their respective cylinders upon seating of the ball valve 48. Thus it will be seen that by so drilling for forming the intake and exhaust channels 30 and 31 that each permits of ready insertion of the valve structures 40 and 45 into their respective channels and that the closure plugs for the channels serve as a retention means for the check valve structures.

Projecting radially from the circumference of the ring-shaped body portion 20 at each of the radially extending bores 22, a set of spaced apertured ears 49 which preferably extend from the inner and outer faces of the annular ring-shaped body. These ears 49 serve as a mounting for pivoted members of the fluid compressor means G and are preferably cast integral with the annular body 20. As will be observed, there are four of these sets of ears 49, one for each of the cylinders 28.

Referring now to the fluid compressor means G, and which acts upon rotary movement of the cam drum E for compressing of the fluid and acting to retard rotation of the vehicle wheel, the same embodies a series of similarly formed anchor arms or levers 50, 51, 52 and 53 each of which are pivotally connected as by means of a suitable hinge pin 54 between each of the sets of ears 49 and extend therefrom in a like general direction circumferentially of the annular body 20 in tangential relation thereto in the annular raceway 55 formed between the periphery of the annular body 20 and inner cam surface of the cam rim 13. The free end of each of the anchor arms 50, 51, 52 and 53 is provided with a bifurcated head 56 which is disposed in overlying relation at the outer end of each of the cylinders 28, and mounted between the arms of the bifurcated head 56 as upon suitable pins 57, are suitable rollers 58 for rolling contact with the inner periphery of the cam rim 13. The inner side of each of the heads 56 is provided with a convex bearing surface 59 which is intended to bear upon a convex-shaped head of cup-shaped pistons 60 slidably mounted in the cylinders 28 and which pistons act as a closure means for the cylinders. Disposed inwardly of each of the cup-shaped pistons 60 is an expansion coil spring 61, one end of which acts upon the piston and the opposite end against the wall at the inner end of the cylinder forming bores 28 in a manner for normally urging the pistons outwardly into contact with the anchor arm heads 56. Thus it will be seen that one of the radially moving pistons 60 is provided for each of the anchor arms 50, 51, 52 and 53, and that each piston is operated independently of the companion pistons. It will also be observed that during rotary movement of the cam drum E, that the free ends of the anchor arms will be moved inwardly and outwardly radially of the stationary cylinder block F for reciprocatory movement of the pistons 60.

Mounted in suitable pockets 63 provided in the annular body 20 between each adjacent cylinder 28 and ears 49 are spiral expander springs 64 the outer ends of which act upon the intermediate portion of the anchor arms for normally urging the head portions 56 of the arms into intimate contact with the inner periphery of the cam rim 13.

Referring now to the control means H whereby the fluid compressor means D may act for retarding rotation of the vehicle wheels B, the same embodies a fluid supply tank 65 which may be mounted at any suitable location upon the vehicle chassis A, and which tank preferably contains a suitable oil which is adapted to be circulated thru the channels 30 and 31 upon actuation of the pistons 60. The tank 65 is provided with a suitable air vent 66. Connected preferably with the lower portion of the tank 65 is an intake pipe or conductor 67 which is provided at opposite ends with Y fittings 68 from which branch conductors 69 lead and are coupled as by means of suitable nipples 70, one into each of the threaded inlet openings 26 communicating with the intake chambers 24. Connected preferably with the upper portion of the tank 65 is an exhaust pipe or conductor 71 provided at opposite ends with Y fittings 72 having branch conductors 73 leading therefrom and connected as by means of suitable nipples 74, one into each of the threaded outlet openings 27 communicating with the outlet or exhaust chambers 25. Arranged in the exhaust pipe or conductor 71 between the Y fittings 72 and its connection with the tank 65, is a control valve 75 operable for opening and closing communication thru the exhaust conductor upon actuation of a suitable lever or pedal 76 operatively connected as by suitable links and levers with an operating arm of the control valve. In the illustration in Figure 2, when the pedal 76 is in its fullest extent of rearward movement the valve 75 is fully open, and is gradually closed upon forward swinging of the pedal for partially or wholly shutting off communication of the fluid thru the exhaust conductor 71 into the tank 65 in accordance with the degree of braking action desired to be obtained upon the vehicle wheels B. When the control valve 75 is in its full open position, rotation of the wheels B in either direction will cause the fluid to have free circulation between the tank 65 and cylinder block F thru the conductors 67 and 71 in the direction of the arrows as indicated in Figure 2.

Referring particularly now to Figures 1 and 3, and wherein it will be observed that the pistons 60 are four in number and arranged at 90° apart, and that the cam projections 15 are five in number and are arranged 72° apart, it will be seen that there are an even number of pistons while the number of cam projections is of an uneven number and greater than that of the number of pistons. This particular number and arrangement of pistons and cam projections has been provided so that only one of the piston will be moving at a time on its compression stroke in order that the fluid will be gradually compressed and thus not act to retard rotation of the wheels B with an objectionable quick action. By observing Figure 1, and noting the direction of rotation of the cam drum E as indicated by the arrow, it will be seen that the anchor arm 50 is engaging the low side of the annular cam surface and in which position its companion piston is in its fullest extent of outward movement; the roller of the arm 51 is approximately half way up the incline of one of the cam projections for imparting inward movement to the piston of the arm 51 for compressing the fluid; the roller of the arm 52 is at the crown of one of the cam projections 15 and having moved the piston of the arm 52 inwardly for its fullest extent, and that the roller of the arm 53 is moving from one of the cam projections 15 for allowing outward movement of the piston operable by the arm 53. Thus it will be observed that the pistons are alternately moved inwardly on their compression stroke by means of the particular number and arrangement of anchor arms and cam projections.

As to the mode of operation of the improved brake, and when desiring to retard rotation of the wheels B, the operator merely presses forwardly on the lever 76 for movement of the valve 75 toward its closed position for either retarding or complete stoppage of the flow of fluid thru the exhaust conductor 71 into the tank 65. As the cam drum E is being rotated by reason of its connection with the wheels B, and the pistons 60 are alternately moved inwardly and outwardly in a manner which will be apparent upon observing Figure 1, the fluid is drawn thru the intake chambers 24 and by-passed into the exhaust chambers 25 whereby the fluid is compressed in the exhaust conductor 71 by reason of its not having ready access to the tank 65 thru the partially closed valve 75. It will readily be apparent the manner in which the intake and exhaust check valves 40 and 45 respectively act for allowing ready passage of the fluid from the intake chambers 24 to the exhaust chambers 25 but prevent retrograde movement of the fluid from the exhaust chambers 25 to the intake chambers 24. This compressing of the fluid in the exhaust chambers 25 will prevent ready inward movement of the free ends of the anchor arms 50, 51, 52 and 53 when engaging the cam projections 15 and thus the wheels are retarded against rotation thru a degree in accordance with the position to which the valve 75 has been moved. If the valve 75 has been only partially closed such will allow for slow passage of the fluid thru the valve and thus create a gradual braking action in accordance with the amount of fluid allowed to by-pass thru the valve. It may be further stated that by so having the cam projections 15 alternately engage the rollers of the anchor arms that one of the anchor arms will at all times be acting to retard rotation of the cam drum and thus not create an intermittent or jerking action. When the valve 75 is fully closed such as when making an emergency or quick stop, the fluid is quickly compressed in the discharge conductor 71 and thus locks the wheels against rotation by preventing inward swinging of the anchor arms.

While the brake apparatus has been shown as being applied to vehicle wheels for retarding rotation thereof, it will be readily apparent that the device may equally well be employed for use in creating a braking action upon rotary members of various descriptions.

From the foregoing description it will be apparent that a novel and improved type of hydraulic brake mechanism has been provided wherein the fluid is not normally maintained under compression and is placed under compression in a manner for acting upon braking elements operable upon rotation of the rotary member for compression of the fluid which in turn acts to restrict movement of the braking members. It will also be apparent that a novel arrangement of cam surfaces and cam engaging elements has been provided wherein rotation of the rotary member is retarded with a smooth movement.

Changes in the shape, size, and arrangement of parts may be made to the specific form of the invention as herein shown and described, without departing from the spirit of the invention or the scope of the following claims.

I claim:

1. A hydraulic brake comprising a stationary cylinder block provided with a series of radially arranged cylinders opening at the circumference of the block, a body of liquid having communication thru the block with the cylinders, a piston movable in each cylinder and projecting from the circumferential face of the cylinder block means normally urging said pistons outwardly of the cylinders, a rotatable cam drum mounted concentric to the cylinder block and having a series of cam projections formed at its inner periphery, braking elements pivotally carried by the stationary cylinder block and engaging one with each of said pistons, said braking elements engaging the cam projections for moving their respective pistons inwardly and causing a forced circulation of said liquid in one direction, means normally urging the braking elements into engagement with said cam drum, and means for variably restricting circulation of the liquid for retarding compression movement of said pistons by the braking elements.

2. A hydraulic brake comprising a stationary cylinder block provided with a series of radially arranged cylinders, a body of liquid having communication thru the block with each cylinder, a piston in each cylinder and projecting radially from the cylinder block, a rotatable cam drum mounted concentric to the cylinder block and having a series of cam projections formed at its inner periphery, an anchor arm pivotally carried by the cylinder block for each cylinder and having its free end slidably engaging its respective piston and engaged by the cam projections for inward movement of the pistons and causing a forced circulation of said liquid in one direction, means normally urging the pistons outwardly and the anchor arms into engagement with the cam drum, and means for variably restricting circulation of the liquid for retarding inward movement of the pistons by their respective anchor arms.

3. A hydraulic brake comprising a stationary cylinder block provided with a series of radially opening cylinders, a body of liquid having communication thru the block with the cylinders, a piston movable in each cylinder and projecting from the cylinder block, spring means normally urging each piston outwardly, a rotatable drum embodying a cam rim arranged concentric to the cylinder block, anchor arms each pivotally mounted at one end upon the cylinder block between each cylinder and each having its free end engaging one with each of the pistons, a roller carried by the free end of each anchor arm and engaging the cam rim for moving said pistons inwardly and causing a forced circulation of said liquid in one direction, and means for restricting circulation of the liquid for variably retarding inward compression movement of said pistons by their respective anchor arms.

4. A hydraulic brake comprising a stationary annular cylinder block provided with a series of equi-distantly spaced apart radially opening cylinders, a body of liquid having communication thru the block with the cylinders, a piston movable in each cylinder, a rotatable drum embodying a cam rim mounted concentric to the cylinder block and provided at its inner periphery with a series of equi-distantly spaced apart inwardly projecting cam projections spaced less degrees apart about the circumference of the rim than the spacing of said cylinders, braking elements carried by the stationary cylinder block for each piston and alternately engageable by the cam projections for moving said pistons inwardly and causing a forced circulation of said liquid in one direction, means for normally urging the pistons together with their respective braking elements toward said cam rim, and means for restricting circulation of the liquid for variably retarding inward compression movement of the pistons by their respective braking elements.

5. A hydraulic brake comprising a stationary annular cylinder block provided with a series of radially opening cylinders, and a series of connected channels forming communication between the cylinders, a body of liquid having communication with the cylinders thru said channels, connected intake and exhaust conductors connecting certain of said channels, check valves mounted in each of said channels for controlling passage of the liquid therethru in one direction, a piston mounted in each cylinder, a rotatable cam rim mounted concentric to the cylinder block, braking elements carried by the cylinder block and engageable by the cam rim for moving said pistons inwardly and causing a forced circulation of said liquid in one direction thru said connected intake and exhaust conductors, and valve means arranged in said conductors for restricting circulation of the liquid therethru for variably retarding inward compression movement of said pistons by the braking elements.

6. A hydraulic brake comprising a stationary annular cylinder block provided with a series of radially arranged cylinders, and a series of communicating channels connecting said cylinders, a check valve in each channel, intake chambers connected with certain of said channels, outlet chambers connected with the remaining channels, a body of liquid having communication with the cylinders thru said channels, connected intake and exhaust conductors connected respectively with the intake and outlet chambers, a piston mounted in each of said cylinders, a rotatable cam rim mounted concentric to the cylinder block, braking elements carried by the cylinder block and engageable by the cam surface of the cam rim for inward movement of said pistons, and causing a forced circulation of the liquid in one direction thru the connected intake and exhaust conductors, and a valve arranged in the conductors between said intake and outlet chambers for variably controlling the circulation of the liquid thru the conductors.

7. A hydraulic brake apparatus comprising a stationary annular cylinder block provided with radially arranged cylinders, connected channels forming communication between the cylinders and arranged in sets of intake and exhaust channels connected respectively with intake and outlet chambers, a check valve structure in each of said channels, a piston for each cylinder, a rotatable cam rim mounted concentric to the cylinder block, braking elements carried by the stationary cylinder block and engageable by the cam surface of the cam rim for inward movement of said pistons, the body of liquid having communication with the cylinders thru said channels, an intake conductor connected with said intake chambers, an exhaust conductor connected with said outlet chambers, a liquid reservoir connecting said conductors, and a valve arranged in the exhaust conductor for restricting circulation of the liquid therethru to the reservoir and retarding compression movement of said pistons by their braking elements.

8. In a hydraulic brake apparatus for vehicles, the combination with a wheel, an axle for mounting of the wheel, and a non-rotatable housing for the axle and having an annular flange formed at the end of the housing, of an annular cylinder block encircling the axle and rigidly connected to said axle housing flange, a series of radially opening cylinders provided in the cylinder block, a body of liquid having communication with the cylinders, a piston movable in each cylinder, a cam drum embodying a plate portion rigidly connected with the wheel for rotation therewith and a cam rim encircling the annular cylinder block, braking elements carried by the cylinder block and engageable by the cam surface of the cam rim for reciprocating said pistons and causing a forced circulation of said liquid in one direction, means for restricting circulation of the liquid for variably retarding compression movement of said pistons by the braking elements, an annular cover plate carried by the inner edge of the cam rim and extending into overlying relation at the inner side of the annular axle housing flange for forming a closed raceway for said braking elements, and an annular packing ring arranged between the overlapping portions of the cover plate and axle housing flange.

9. In a brake apparatus of the class described and as a subcombination, a cylinder block construction comprising an annular body formed with a series of equi-distantly spaced apart alternately arranged intake and outlet chambers formed by drilling bores radially into the circumferential face of the body and then closing the outer ends of the bores by suitable plug elements, cylinder forming bores drilled radially into the circumferential face of the body midway between each chamber forming bore for reciprocatory mounting of radially moving pistons, intake channel forming bores drilled into the body in tangential relation to the circumferential face of the body and extending one into each of said cylinder forming bores, exhaust channel forming bores drilled into the body in tangential relation to the circumferential face of the body and extending one into each of said cylinder forming bores, said intake forming bores intersecting at the intake chambers and said exhaust forming bores intersecting at said outlet chambers whereby each cylinder forming bore has communication with adjacent intake and outlet chambers, a check valve structure embodying a sleeve portion, insertable into each of the intake and exhaust forming bores for automatic control of fluid therethrough, and plugs insertable into the outer end of each channel forming bore for closing the outer ends thereof and serving as a retention means for the check valve structures.

10. A hydraulic brake comprising a stationary cylinder block provided with a series of equi-distantly spaced apart radially opening cylinders, a body of liquid having communication thru the block with the cylinders, a piston movable in each cylinder, a rotatable drum embodying a cam rim mounted concentric to the cylinder block and provided at its inner periphery with a series of equi-distantly spaced apart inwardly projecting cam projections for operation of said pistons, said cam projections spaced less degrees apart about the circumference of the rim than the spacing of said cylinders, and means for restricting circulation of the liquid for variably retarding inward compression movement of the pistons.

11. A hydraulic brake comprising a stationary cylinder block provided with a series of radially opening cylinders, and a series of connected channels forming communication between the cylinders, a body of liquid having communication with the cylinders thru said channels, connected intake and exhaust conductors connecting certain of said channels, check valves mounted in each of said channels for controlling passage of the liquid therethru in one direction, a piston mounted in each cylinder, a rotatable cam rim mounted concentric to the cylinder block for operating said pistons, and valve means arranged in said conductors for restricting circulation of the liquid therethru for variably retarding inward compression movement of said pistons.

12. A hydraulic brake comprising a stationary cylinder block provided with a series of radially arranged cylinders and a series of communicating channels connecting said cylinders, a check valve in each channel, intake chambers connected with certain of said channels, outlet chambers connected with the remaining channels, a body of liquid having communication with the cylinders thru said channels, connected intake and exhaust conductors connected respectively with the intake and outlet chambers, a piston mounted in each of said cylinders, a rotatable cam rim mounted concentric with the cylinder block for inward movement of said pistons, and causing a forced circulation of the liquid in one direction thru the connected intake and exhaust conductors, spring means normally urging said pistons outwardly, and a valve arranged in the conductors between said intake and outlet chambers for variably controlling the circulation of the liquid thru the conductors.

13. A hydraulic brake apparatus comprising a stationary cylinder block provided with radially arranged cylinders, connected channels forming communication between the cylinders and arranged in sets of intake and exhaust channels connected respectively with intake and outlet chambers, a check valve structure in each of said channels, a piston for each cylinder, a rotatable cam rim mounted concentric to the cylinder block for inward movement of said pistons, spring means normally urging said pistons outwardly, a body of liquid having communication with the cylinders thru said channels, an intake conductor connected with said intake chambers, an exhaust conductor connected with said outlet chamber, a liquid reservoir connecting said conductors, and a valve arranged in the exhaust conductor for restricting circulation of the liquid therethru to the reservoir and retarding compression movement of said pistons.

14. In a hydraulic brake apparatus for vehicles, the combination with a wheel, an axle for mounting of the wheel, and a non-rotatable housing for the axle having an annular flange rigid therewith, of an annular cylinder block encircling the axle and rigidly connected to said axle housing flange, a series of radially opening cylinders provided in the cylinder block, a body of liquid having communication with the cylinders, a piston movable in each cylinder, a cam drum embodying a plate portion rigidly connected with the wheel for rotation therewith and a cam rim encircling the annular cylinder block for reciprocating said pistons and causing a forced circulation of said liquid in one direction, means for restricting circulation of the liquid for variably retarding compression movement of said pistons, an annular cover plate carried by the inner edge of the cam rim and extending into overlying relation at the inner side of the annular axle housing flange for forming a closed raceway for said cam rim and pistons, and an annular packing ring arranged between the overlapping portions of the cover and axle housing flange.

WILLIAM E. ROTH.